United States Patent
Su (10) Patent No.: US 12,556,100 B2
(45) Date of Patent: Feb. 17, 2026

(54) MULTI-PHASE POWER CONVERTER CIRCUIT AND CONTROL CIRCUIT THEREOF

(71) Applicant: PowerX Semiconductor Corporation, Hsinchu County (TW)

(72) Inventor: Chih-Chieh Su, Hsinchu County (TW)

(73) Assignee: PowerX Semiconductor Corporation, Hsinchu County (TW)

( * ) Notice: Subject to any disclaimer, the term of this patent is extended or adjusted under 35 U.S.C. 154(b) by 169 days.

(21) Appl. No.: 18/594,013

(22) Filed: Mar. 4, 2024

(65) Prior Publication Data

US 2025/0141358 A1  May 1, 2025

(30) Foreign Application Priority Data

Oct. 25, 2023 (TW) ................... 112140915

(51) Int. Cl.
- *G05F 1/575* (2006.01)
- *G05F 1/565* (2006.01)
- *H02M 1/00* (2006.01)
- *H02M 3/158* (2006.01)

(52) U.S. Cl.
CPC ....... *H02M 3/1586* (2021.05); *H02M 1/0022* (2021.05); *H02M 1/0025* (2021.05); *G05F 1/565* (2013.01); *G05F 1/575* (2013.01)

(58) Field of Classification Search
CPC .......... G05F 1/461; G05F 1/462; G05F 1/565; G05F 1/575; G05F 1/59
See application file for complete search history.

(56) References Cited

U.S. PATENT DOCUMENTS

| 2015/0022171 A1* | 1/2015 | Chen ............. H02M 3/158 323/282 |
| 2015/0077083 A1* | 3/2015 | Chen ............. H02M 3/156 323/288 |
| 2016/0294278 A1 | 10/2016 | Li et al. |
| 2021/0296995 A1* | 9/2021 | Zhang ............. H02M 3/158 |

FOREIGN PATENT DOCUMENTS

| TW | 201340570 A | 10/2013 |
| TW | 201947857 A | 12/2019 |
| WO | 2015/138189 A1 | 9/2015 |

* cited by examiner

*Primary Examiner* — Gary A Nash
(74) *Attorney, Agent, or Firm* — CKC & Partners Co., LLC (57) ABSTRACT

The application provides a multi-phase power converter circuit and a control circuit thereof. The multi-phase power converter circuit receives an input voltage at a voltage input terminal, outputs an output voltage at a voltage output terminal, and includes a power stage circuit. The power stage circuit is coupled to the voltage input terminal and a phase output terminal. The control circuit is coupled to the power stage circuit, the phase output terminal and the voltage output terminal, generates an error signal according to a phase current of the phase output terminal, the output voltage and a reference voltage, generates a compensation signal according to the reference voltage and the error signal, generates a ramp signal according to the error signal, and controls the power stage circuit to operate according to a predetermined duty ratio when the ramp signal crosses the compensation signal, so as to increase the phase current.

20 Claims, 4 Drawing Sheets

MULTI-PHASE POWER CONVERTER CIRCUIT AND CONTROL CIRCUIT THEREOF

CROSS-REFERENCE TO RELATED APPLICATION

This application claims priority to Taiwan Application Serial Number 112140915, filed Oct. 25, 2023, which is herein incorporated by reference in its entirety.

BACKGROUND

Technical Field

The present disclosure relates to a control circuit, and particularly relates to a control circuit applied to a multi-phase power converter circuit.

Description of Related Art

With the development of the semiconductor technology, a multi-phase power converter circuit is increasingly important for the load transient response. In some the related art approaches, an output voltage will be subtracted from a reference voltage to get an error signal, then the error signal is converted into a current signal to charge a capacitor to obtain a sawtooth wave signal, and then the sawtooth signal is compared with another reference voltage to obtain a pulse-width modulation (PWM) control signal. However, under the above operations of the load transient, the reference voltage is a constant value, and the sawtooth wave signal is a result generated by conversion of the error signal, so that the response speed is slow, thus presenting a poor transient response. Therefore, there is a need for a novel approach to solve the above problems.

SUMMARY

An aspect of the present disclosure relates to a control circuit applicable to a multi-phase power converter circuit. The control circuit includes an error detection circuit, a compensation generation circuit, a ramp generation circuit and a comparison circuit. The error detection circuit is coupled to a phase output terminal and a voltage output terminal of the multi-phase power converter circuit, and configured to detect a phase current of the phase output terminal and an output voltage of the voltage output terminal, and to output an error signal associated with the phase current, the output voltage and a reference voltage. The compensation generation circuit is coupled to the error detection circuit, and configured to output a compensation signal according to the error signal and the reference voltage. The ramp generation circuit is coupled to the error detection circuit, and configured to output a ramp signal according to the error signal. The comparison circuit is coupled to the compensation generation circuit and the ramp generation circuit, and configured to receive the compensation signal and the ramp signal, and to generate at least one trigger pulse when the ramp signal crosses the compensation signal.

Another aspect of the present disclosure relates to a multi-phase power converter circuit. The multi-phase power converter circuit is configured to receive an input voltage at a voltage input terminal and to output an output voltage at a voltage output terminal, and includes a power stage circuit and a control circuit. The power stage circuit is coupled to the voltage input terminal, and coupled to a phase output terminal via an inductor. The control circuit is coupled to the power stage circuit, the phase output terminal and the voltage output terminal, and configured to generate an error signal according to a phase current of the phase output terminal, the output voltage and a reference voltage, to generate a compensation signal according to the reference voltage and the error signal, to generate a ramp signal according to the error signal, and to control the power stage circuit to operate according to a predetermined duty ratio when the ramp signal crosses the compensation signal, so as to increase the phase current.

In summary, compared with the related art approach, the control circuit and the multi-phase power converter circuit of the present disclosure have the advantages of better responsiveness to load transients and the like via a compensation signal and a ramp signal that respond inversely to changes in an output voltage.

DETAILED DESCRIPTION

The following describes embodiments in detail with reference to the drawings. However, the specific embodiments described are only intended to illustrate the present disclosure, rather than to define the present disclosure, and the description on structure operations is not adopted to limit the order in which the structure operations are performed; and any device with an equal effect resulting from structures formed by recombination of elements falls within the scope of the present disclosure.

Terms used throughout the specification and the claims of the present disclosure, unless otherwise specified, generally have the ordinary meaning of each term used in the art, in the present disclosure and in special contents.

The term "coupled" or "connected" used herein may indicate that two or more elements are in direct physical or electrical contact with each other, or that two or more elements are in indirect physical or electrical contact with each other, and also may indicate that two or more elements operate or interact with each other.

Figure 1:
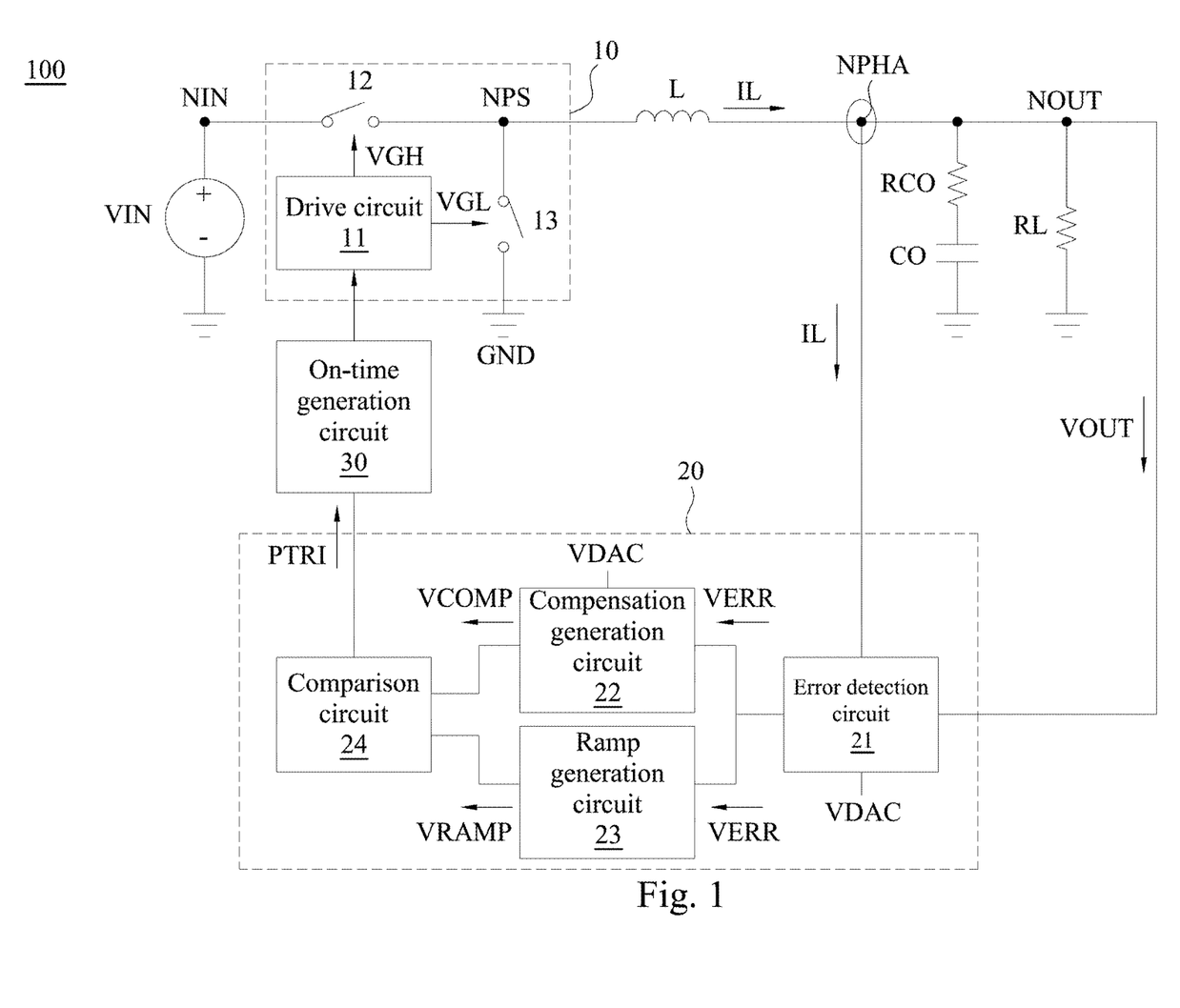
FIG. 1 is a circuit schematic of a multi-phase power converter circuit according to some embodiments of the present disclosure.

Referring to FIG. 1, FIG. 1 is a circuit schematic of a multi-phase power converter circuit 100 according to some embodiments of the present disclosure. In particular, the multi-phase power converter circuit 100 can be, for example, a DC/DC (direct-current) converter such as a multi-phase buck converter. In some embodiments, the multi-phase power converter circuit 100 is configured to receive an input voltage VIN at a voltage input terminal NIN and to output an output voltage VOUT at a voltage output terminal NOUT to supply power to a load (not shown in the figure) such as a central processing unit (CPU), for example.

A load resistor RL coupled to the voltage output terminal NOUT in FIG. 1 is an equivalent resistor of the load.

In some embodiments, the multi-phase power converter circuit 100 includes a power stage circuit 10, a control circuit 20, and an on-time generation circuit 30. As shown in FIG. 1, the power stage circuit 10 is electrically coupled to the voltage input terminal NIN. An output terminal NPS of the power stage circuit 10 is coupled to a phase output terminal NPHA via an inductor L, and the phase output terminal NPHA is coupled to the voltage output terminal NOUT. The control circuit 20 is coupled to the phase output terminal NPHA, the voltage output terminal NOUT and the on-time generation circuit 30, while the on-time generation circuit 30 is coupled to the power stage circuit 10.

In some embodiments, the power stage circuit 10 includes a drive circuit 11, a high-side switch 12, and a low-side switch 13. The high-side switch 12 is coupled between the voltage input terminal NIN (or the input voltage VIN) and the output terminal NPS, while the low-side switch 13 is coupled between the output terminal NPS and a grounding voltage GND. In other words, the high-side switch 12 and the low-side switch 13 are connected in series between the input voltage VIN and the grounding voltage GND. The drive circuit 11 is controlled by, for example, a control signal (not shown) such as a pulse width modulation (PWM) signal, and the high-side switch 12 and low-side switch 13 are driven by a drive signal VGH and a drive signal VGL to be turned on alternately, such that a phase current IL is output from the inductor L. In particular, each of the high-side switch 12 and the low-side switch 13 can be implemented by a transistor, but the present disclosure is not limited to this.

In FIG. 1, the power stage circuit 10 and the inductor L correspond to one of phases of the multi-phase power converter circuit 100. Although the remaining phases of the multi-phase power converter circuit 100 are not shown in FIG. 1, it should be understood that the remaining phases of the multi-phase power converter circuit 100 also correspondingly contain a set of the power stage circuit and the inductor, and the setting and operation of the power stage circuits and inductors in the remaining phases are similar to those of the power stage circuit 10 and the inductor L in FIG. 1, and thus are omitted here. Outputs of all phases in the multi-phase power converter circuit 100 will be added together at the phase output terminal NPHA to provide the output voltage VOUT at the voltage output terminal NOUT. The sum of the outputs of all phase in the multi-phase power converter circuit 100 can be, for example, a sum of the phase current IL in FIG. 1 and the phase currents of the remaining phases. Since the remaining phases of the multi-phase power converter circuit 100 are not shown in FIG. 1, in the following embodiments, the sum of all phase currents will be represented by the phase current IL in FIG. 1.

In some embodiments, a resistor RCO and a decoupling capacitor CO are connected in series between the phase output terminal NPHA and the voltage output terminal NOUT, and are connected in parallel with the load resistor RL to optimize the responsiveness of the multi-phase power converter circuit 100 to load transients.

For example, in some practical applications, the load may require a larger operating current due to a temporary task variation (for example, running a specific application and/or software), that is, the multi-phase power converter circuit 100 requires an increase in the magnitude of the phase current IL. Based on some non-ideal factors, the phase current IL cannot be immediately increased to the operating current required by the load. At this time, the decoupling capacitor CO electrically coupled to the voltage output terminal NOUT in the multi-phase power converter circuit 100 will discharge to compensate for the lack of the phase current IL. However, the discharge of the decoupling capacitor CO causes the output voltage VOUT to have a undershoot phenomenon.

For this reason, in some embodiments, the control circuit 20 and the on-time generation circuit 30 are coupled between the voltage output terminal NOUT and the power stage circuit 10 to form a feedback loop. Through the feedback loop, the multi-phase power converter circuit 100 can mitigate the undershoot phenomenon of the output voltage VOUT, and this principle will be further explained in the following paragraphs.

In some embodiments, as shown in FIG. 1, the control circuit 20 includes an error detection circuit 21, a compensation generation circuit 22, a ramp generation circuit 23, and a comparison circuit 24. The error detection circuit 21 is coupled to the phase output terminal NPHA and the voltage output terminal NOUT, and configured to detect the phase current IL and the output voltage VOUT, to receive a reference voltage VDAC, and to output an error signal VERR according to the phase current IL, the output voltage VOUT and the reference voltage VDAC. Thus, the error signal VERR is associated with the phase current IL, the output voltage VOUT and the reference voltage VDAC. The compensation generator circuit 22 is coupled to the error detection circuit 21, and configured to receive the reference voltage VDAC and the error signal VERR, and to output a compensation signal VCOMP according to the reference voltage VDAC and the error signal VERR. The ramp generation circuit 23 is coupled to the error detection circuit 21, and configured to receive the error signal VERR, and to output a ramp signal VRAMP according to the error signal VERR. Also, the comparison circuit 24 is coupled to the compensation generation circuit 22, the ramp generation circuit 23 and the on-time generation circuit 30, and configured to receive the compensation signal VCOMP and the ramp signal VRAMP, and to compare the compensation signal VCOMP with the ramp signal VRAMP.

Following the description of the above practical application, in some embodiments, the output voltage VOUT is significantly reduced due to a load task variation (i.e., an undershoot occurs in the output voltage VOUT), which further affects the error signal VERR output according to the phase current IL, the output voltage VOUT, and the reference voltage VDAC. For example, magnitudes (e.g., voltage levels, etc.) of the error signal VERR will increase. Then, the change of the error signal VERR affects the compensation signal VCOMP and the ramp signal VRAMP respectively, so that the magnitudes of the compensation signal VCOMP and the ramp signal VRAMP change. In particular, the ramp signal VRAMP may cross the compensation signal VCOMP at some points in time, and this phenomenon will be further illustrated in the following paragraphs with reference to FIGS. 2 and 3. The description "one signal crosses another signal" herein means that a voltage level of the one signal exceeds or is greater than that of the another signal.

In some embodiments, as shown in FIG. 1, the comparison circuit 24 generates at least one trigger pulse PTRI to the on-time generation circuit 30 when the ramp signal VRAMP crosses the compensation signal VCOMP. When being triggered by the trigger pulse PTRI, the on-time generation circuit 30 controls the power stage circuit 10 to operate according to a predetermined duty ratio, so as to increase the phase current IL and stabilize the output voltage VOUT by, for example, changing a duty ratio of the aforementioned control signal.

In some embodiments, the magnitudes of the error signal VERR decrease with the increase of the phase current IL and the stabilization of the output voltage VOUT (i.e., the undershoot phenomenon of the output voltage VOUT is mitigated), such that the compensation signal VCOMP may cross the ramp signal VRAMP at another time point after a certain time point. In response to that the compensation signal VCOMP crosses the ramp signal VRAMP, the comparison circuit 24 stops generating the trigger pulse PTRI to the on-time generation circuit 30, and then the on-time generation circuit 30 correspondingly controls the power stage circuit 10 to operate according to an initial duty ratio, wherein the initial duty ratio is less than the aforementioned predetermined duty ratio.

As can be seen from the description of the above embodiments, the control circuit 20 is configured to generate the error signal VERR according to the phase current IL of the phase output terminal NPHA, the output voltage VOUT and the reference voltage VDAC, configured to generate the compensation signal VCOMP according to the reference voltage VDAC and the error signal VERR, configured to generate the ramp signal VRAMP according to the error signal VERR, and configured to trigger the on-time generation circuit 30 to control the power stage circuit 10 to operate according to the predetermined duty ratio when the ramp signal VRAMP crosses the compensation signal VCOMP, so as to increase the phase current IL. In addition, the control circuit 20 is further configured to trigger the on-time generation circuit 30 to control the power stage circuit 10 to operate according to the initial duty ratio when the compensation signal VCOMP crosses the ramp signal VRAMP, so as to reduce the phase current IL.

Figure 2:
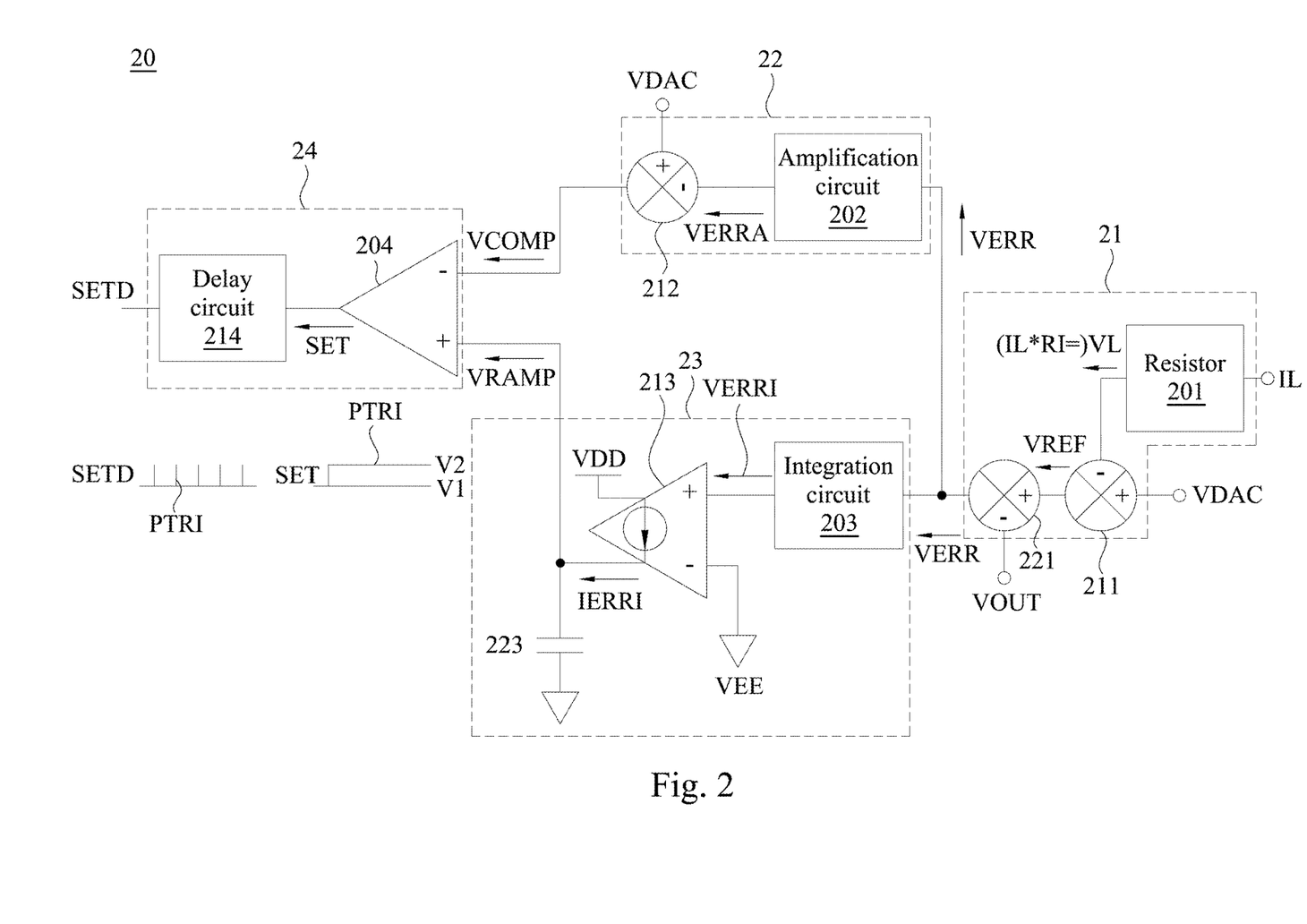
FIG. 2 is a circuit schematic of a control circuit according to some embodiments of the present disclosure.

The circuit structures of the error detection circuit 21, the compensation generation circuit 22, the ramp generation circuit 23 and the comparison circuit 24 will then be illustrated with reference to FIG. 2. Referring to FIG. 2, FIG. 2 is a circuit schematic of the control circuit 20 according to some embodiments of the present disclosure.

In the embodiment of FIG. 2, the error detection circuit 21 includes a resistor 201, an operational circuit 211, and an operational circuit 221. In some embodiments, the resistor 201 is coupled to the phase output terminal NPHA of the multi-phase power converter circuit 100 in FIG. 1, and configured to generate a conversion voltage VL dependent on the phase current IL, that is, the conversion voltage VL is a dependent source corresponding to the phase current IL. As shown in FIG. 2, the conversion voltage VL may be in a voltage level representing multiplication of the phase current IL by a resistance value RI of the resistor 201. The operational circuit 211 is coupled to the resistor 201, and configured to receive the conversion voltage VL and the reference voltage VDAC, and to generate a dependent reference voltage VREF according to a difference between the reference voltage VDAC and the conversion voltage VL. In particular, the dependent reference voltage VREF may be in a voltage level representing the reference voltage VDAC minus the conversion voltage VL. As can be seen from the description of the conversion voltage VL, the voltage level of the dependent reference voltage VREF is related to the magnitude of the phase current IL. The operational circuit 221 is coupled to the operational circuit 211 and configured to receive the dependent reference voltage VREF and the output voltage VOUT, and to generate the error signal VERR according to a difference between the dependent reference voltage VREF and the output voltage VOUT. In particular, the error signal VERR may be in a voltage level representing subtraction of the output voltage VOUT from the reference voltage VREF. In view of the above, the voltage level of the error signal VERR can be calculated by the formula (1) below.

$$VERR = (VDAC - (IL \times RI)) - VOUT \quad (1)$$

In the above formula (1), both the resistance value RI and the reference voltage VDAC are predetermined to be fixed values. For example, the resistance value RI ranges from 0.5 to 4 milliohms, while the reference voltage VDAC ranges from 0 to 1.52 volts. In addition, the dependent reference voltage VREF is a reference value that is set to be followed by the output voltage VOUT of the multi-phase power converter circuit 100.

In the embodiment of FIG. 2, the compensation generation circuit 22 includes an amplification circuit 202 and an operational circuit 212. The amplification circuit 202 is coupled to the error detection circuit 21 and configured to receive the error signal VERR, and to amplify the error signal VERR to output an amplified error signal VERRA. The operational circuit 212 is coupled to the amplification circuit 202 and the comparison circuit 24 and configured to receive the reference voltage VDAC and the amplified error signal VERRA, and to output the compensation signal VCOMP according to a difference between the reference voltage VDAC and the amplified error signal VERRA. In particular, the compensation signal VCOMP may be in a voltage level representing subtraction of the amplified error signal VERRA from the reference voltage VDAC. In the present disclosure, an error amount (i.e., the error signal VERR) is amplified by the amplification circuit 202, and then subtracted from the reference voltage VDAC. In such a way, the error amount is quickly reflected in the compensation signal VCOMP through the amplification circuit 202 (since the compensation signal VCOMP is not generated through an integrator and a transconductance amplifier), so that the ramp signal VRAMP and the compensation signal VCOMP cross faster to rapidly reduce the error amount (that is, reduce the magnitude of the error signal VERR). As a result, an entire control loop (e.g., the control circuit 20 and the on-time generation circuit 30) has a better transient response.

As can be seen from the description of the compensation generation circuit 22 in FIG. 2, in some embodiments, the compensation generation circuit 22 is configured to receive the reference voltage VDAC and the error signal VERR, to amplify the error signal VERR, and to output the compensation signal VCOMP according to a computation value (i.e., a difference between the reference voltage VDAC and the amplified error signal VERRA) generated based on the reference voltage VDAC and the amplified error signal VERR.

In the embodiment of FIG. 2, the ramp generation circuit 23 includes a capacitor 223, an integration circuit 203, and a transconductance amplification circuit 213. The integration circuit 203 is coupled to the error detection circuit 21 and configured to receive the error signal VERR, and to integrate the error signal VERR to output an integrated error signal VERRI. The transconductance amplification circuit 213 is coupled to the integration circuit 203, the capacitor 223 and the comparison circuit 24, and configured to receive a first power supply voltage VDD, the integrated error signal VERRI and a second power supply voltage VEE, and to convert the integrated error signal VERRI into a conversion current IERRI to charge the capacitor 223 by the conversion current IERRI, so as to output the ramp signal VRAMP.

As can be seen from the description of the ramp generation circuit 23 in FIG. 2, in some embodiments, the ramp generation circuit 23 is configured to receive the error signal VERR, to perform an operation (i.e., an integral operation) on the error signal VERR, and to perform a voltage-to-current conversion on the error signal VERR subjected to the operation (i.e., the integrated error signal VERRI) to output the ramp signal VRAMP.

In the embodiment of FIG. 2, the comparison circuit 24 includes a comparator 204 and a delay circuit 214. As shown in FIG. 2, the comparator 204 has an inverting input terminal and a non-inverting input terminal. The compensation generation circuit 22 is coupled to the inverting input terminal of the comparator 204, and the ramp generation circuit 23 is coupled to the non-inverting input terminal of the comparator 204. In other words, the inverting input terminal of the comparator 204 is configured to receive the compensation signal VCOMP, and the non-inverting input terminal of the comparator 204 is configured to receive the ramp signal VRAMP. Accordingly, the comparator 204 compares the ramp signal VRAMP with the compensation signal VCOMP to output a setting signal SET. In some embodiments, the comparator 204 is configured to adjust a voltage level of the setting signal SET according to a comparison result of the ramp signal VRAMP and the compensation signal VCOMP. The delay circuit 214 is coupled to the comparator 204 and configured to receive the setting signal SET, and to delay the output of the setting signal SET to output another setting signal SETD.

Figure 3:
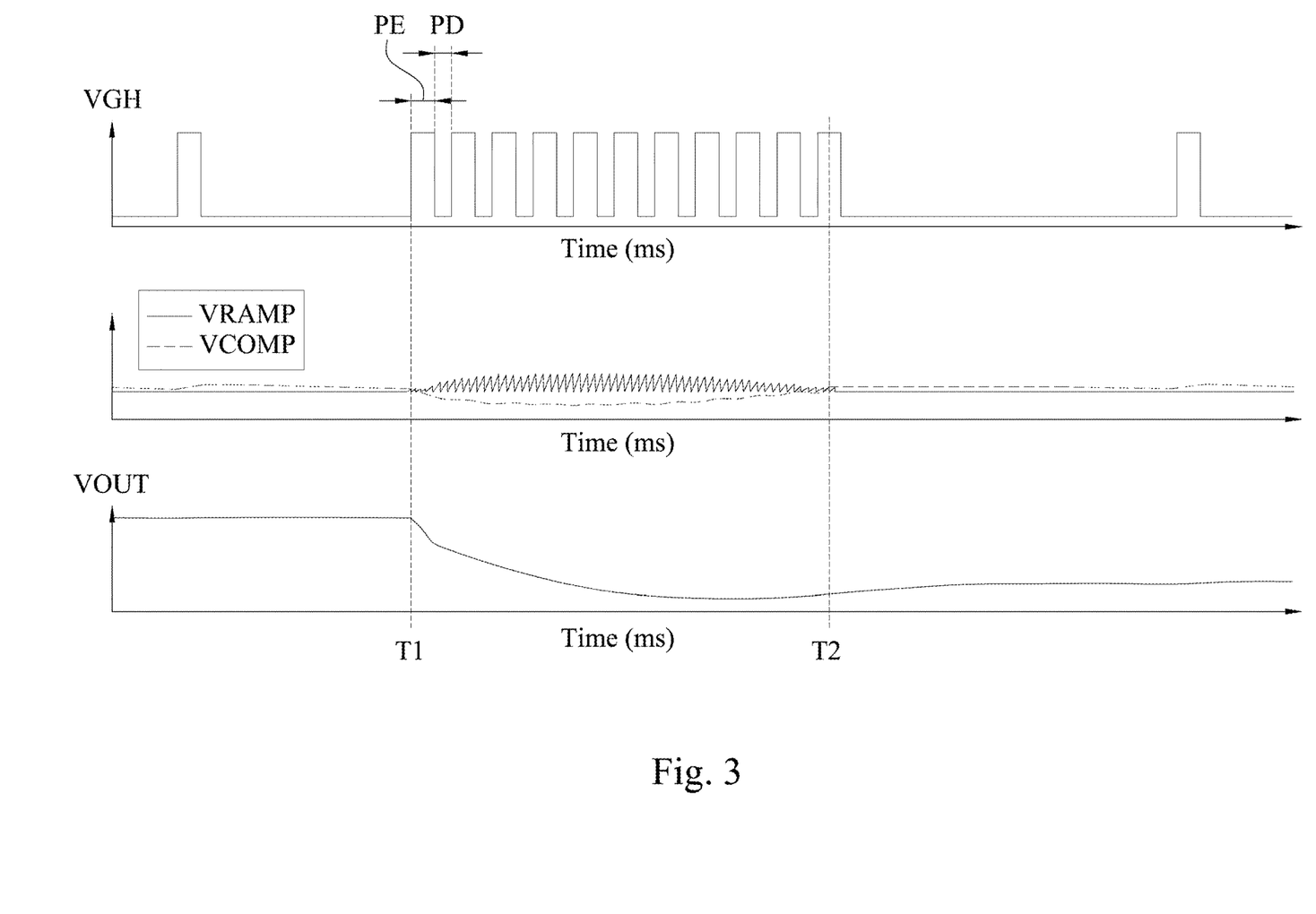
FIG. 3 is a sequence diagram of some signals in the multi-phase power converter circuit according to some embodiments of the present disclosure.

The relationship among the ramp signal VRAMP, the compensation signal VCOMP, the setting signal SET, and the setting signal SETD is further illustrated with reference to FIG. 3. Referring to FIG. 3, FIG. 3 is a sequence diagram of some signals in the multi-phase power converter circuit 100 according to some embodiments of the present disclosure.

In some embodiments, as shown in FIG. 3, at the time point T1, the output voltage VOUT decreases due to a load task variation. With reference to the above formula (1), it can be seen that when the phase current IL does not increase, the decrease of the output voltage VOUT will cause the increase of the voltage level of the error signal VERR. Then, as can be seen from the above description of the compensation signal VCOMP, an increase in the voltage level of the error signal VERR will result in a decrease in the voltage level of the compensation signal VCOMP. Also, with the change of the voltage level of the error signal VERR, the voltage level of the ramp signal VRAMP gradually begins to change with a continuous ramp waveform (or a continuous triangle waveform, a sawtooth waveform, etc.). As can be seen from FIG. 3, the compensation signal VCOMP and the ramp signal VRAMP substantially have opposite responses to a decrease in the output voltage VOUT. Accordingly, at the time point T1, the ramp signal VRAMP crosses (or is greater than) the compensation signal VCOMP.

Following an embodiment in which the comparator 204 adjusts the voltage level of the setting signal SET according to the comparison result of the ramp signal VRAMP and the compensation signal VCOMP, as shown in FIG. 2, when the ramp signal VRAMP is greater than the compensation signal VCOMP, the comparator 204 adjusts the setting signal SET from a first voltage level V1 to a second voltage level V2 higher than the first voltage level V1. Also, the setting signal SET with the second voltage level V2 is delayed via the delay circuit 214 to be output each fixed time interval (i.e., output as another setting signal SETD) to generate at least one trigger pulse PTRI.

Then, as shown in FIG. 1, the trigger pulse PTRI triggers the on-time generation circuit 30 to control the power stage circuit 10 to operate according to a predetermined duty ratio. For example, in some embodiments, the drive circuit 11 in the power stage circuit 10 is controlled by the on-time generation circuit 30 to adjust the drive signal VGH for driving the high-side switch 12 and the drive signal VGL for driving the low-side switch 13 such that the power stage circuit 10 operates according to the predetermined duty ratio.

In FIG. 3, after the time point T1, each cycle of the drive signal VGH has an enable period PE and a disable period PD. As can be seen from FIG. 3, the enable period PE of the drive signal VGH after the time point T1 is approximately equivalent to the enable period of the drive signal VGH before the time point T1. However, the disable period PD of the drive signal VGH after the time point T1 is obviously shorter than the disable period of the drive signal VGH before the time point T1. In other words, the duty ratio of the drive signal VGH increases after the time point T1 (that is, after the trigger pulse PTRI triggers the on-time generation circuit 30).

In the embodiment of FIG. 3, the high-side switch 12 is turned on during the enable period PE and turned off during the disable period PD. In other words, after the time point T1, the high-side switch 12 will be frequently turned on and off alternately, which also means that the output per unit time of the power stage circuit 10 will increase. Since the high-side switch 12 and the low-side switch 13 are usually turned on alternately, the operation of the low-side switch 13 can be inferred from the operation of the high-side switch 12, and thus the description of the low-side switch 13 and the drive signal VGL are omitted here.

In summary, the power stage circuit 10 operates according to the predetermined duty ratio (e.g., the percentage the enable period PE accounts for the total of the enable period PE and the disable period PD), so that the phase current IL in FIG. 1 increases, and the reduction speed of the output voltage VOUT decreases as shown in FIG. 3.

In some embodiments, the phase current IL is substantially close to the operating current required by the load, and the output voltage VOUT is substantially close to the aforementioned dependent reference voltage VREF (i.e., the output voltage VOUT is stable, and the undershoot phenomenon of the output voltage VOUT is mitigated). The voltage level of the error signal VERR in this case will be obviously less than the voltage level of the error signal VERR at the time point T1. Based on the decrease in the voltage level of the error signal VERR, the voltage level of the compensation signal VCOMP will increase, and the voltage level of the ramp signal VRAMP begins to change from the continuous ramp waveform back to the flat waveform. Accordingly, as shown in FIG. 3, at the time point T2, the compensation signal VCOMP crosses (or is greater than) the ramp signal VRAMP.

It can be seen from the description of the comparison circuit 24 above that as the compensation signal VCOMP crosses the ramp signal VRAMP, the comparator 204 adjusts the setting signal SET from the second voltage level V2 to the first voltage level V1, so that the setting signal SETD output by the delay circuit 214 is also further maintained in the first voltage level V1 (equivalent to no trigger pulse PTRI generated). Thus, when the compensation signal VCOMP crosses the ramp signal VRAMP, the comparison circuit 24 stops generating the trigger pulse PTRI. Please note that the first voltage level V1 may be a low logical level, and the second voltage level V2 may be a high logical level.

Figure 4:
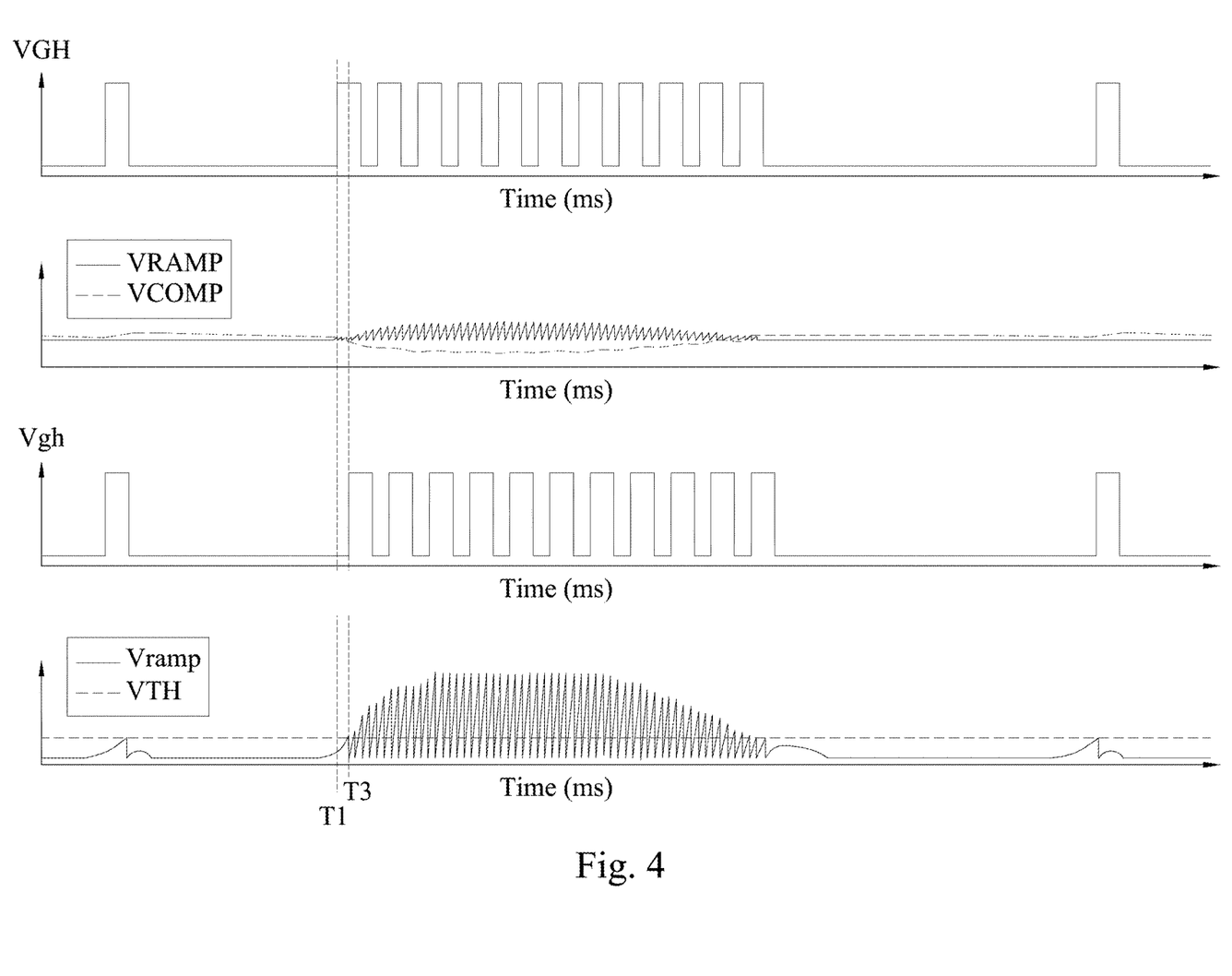
FIG. 4 is a sequence diagram of some signals in the multi-phase power converter circuit and some signals in the related art approach according to some embodiments of the present disclosure.

Referring to FIG. 4, FIG. 4 is a sequence diagram of some signals in the multi-phase power converter circuit 100 and some signals in the related art approach according to some embodiments of the present disclosure.

FIG. 4 shows the compensation signal VCOMP and the ramp signal VRAMP generated by the aforementioned circuit architecture of the present disclosure, and shows a ramp signal Vramp and a fixed threshold value VTH generated by a circuit architecture of a related art approach. As can be seen from FIG. 4, compared with the related art approach where the ramp signal Vramp crosses the threshold value VTH only at the time point T3 (i.e., the ramp signal Vramp crosses the threshold value VTH), the cross of the compensation signal VCOMP and the ramp signal VRAMP (i.e., the ramp signal VRAMP crosses the compensation signal VCOMP) occurs at the time point T1 which is earlier than the time point T3 in the present disclosure. Thus, as shown in FIG. 4, the timing the drive signal VGH of the present disclosure starts to generate rapid and continuous pulses is ahead of the drive signal Vgh of the related art approach, i.e., the power stage circuit 10 of the present disclosure may start to operate according to a predetermined duty ratio earlier.

As can be seen from the above embodiments of the present disclosure, with the compensation signal VCOMP and the ramp signal VRAMP having opposite responses to the change of the output voltage VOUT, the control circuit 20 and the multi-phase power converter circuit 100 of the present disclosure have advantages of better load transient response over the related art approaches.

It should be understood that the multi-phase power converter circuit 100 of the present disclosure is not limited to the circuit architecture shown in FIG. 1. For example, the on-time generation circuit 30 can be integrated into the control circuit 20. Accordingly, in some embodiments, the multi-phase power converter circuit 100 includes the power stage circuit 10 and the control circuit 20. The control circuit 20 is coupled to the power stage circuit 10, the phase output terminal NPHA and the voltage output terminal NOUT. In this circuit architecture, the control circuit 20 controls the power stage circuit 10 to operate according to the predetermined duty ratio when the ramp signal VRAMP crosses the compensation signal VCOMP, so as to increase the phase current IL.

In addition, as can be seen from the embodiment of FIG. 2, the comparison circuit 24 includes the comparator 204 and the delay circuit 214, and switches the voltage level of the setting signal SETD from the first voltage level V1 to the second voltage level V2 each fixed time interval when the ramp signal VRAMP is greater than the compensation signal VCOMP, to generate at least one trigger PTRI. However, the present disclosure is not limited to this. For example, the delay circuit 214 can be omitted, or integrated into the on-time generation circuit 30. Accordingly, in some embodiments, the delay circuit 214 can be omitted from the comparison circuit 24 in FIG. 2. In the circuit architecture where the delay circuit 214 is omitted, when the ramp signal VRAMP crosses the compensation signal VCOMP, the comparison circuit 24 adjusts the setting signal SET from the first voltage level V1 to the second voltage level V2 to generate the trigger pulse PTRI.

Although the present disclosure has been disclosed as above in embodiments, the embodiments are not intended to limit the present disclosure, and those of ordinary skill in the art may make various changes and embellishments within the spirit and scope of the present disclosure, therefore, the scope of protection of the present disclosure shall be defined in the attached claims.

What is claimed is:

1. A control circuit applicable to a multi-phase power converter circuit and comprising:
    an error detection circuit, coupled to a phase output terminal and a voltage output terminal of the multi-phase power converter circuit, and configured to detect a phase current of the phase output terminal and an output voltage of the voltage output terminal, and to output an error signal associated with the phase current, the output voltage and a reference voltage;
    a compensation generation circuit, coupled to the error detection circuit, and configured to output a compensation signal according to the error signal and the reference voltage;
    a ramp generation circuit, coupled to the error detection circuit, and configured to output a ramp signal according to the error signal; and
    a comparison circuit, coupled to the compensation generation circuit and the ramp generation circuit, and configured to receive the compensation signal and the ramp signal, and to generate at least one trigger pulse when the ramp signal crosses the compensation signal.

2. The control circuit according to claim 1, wherein the compensation generation circuit is configured to receive the reference voltage and the error signal, configured to amplify the error signal, and configured to output the compensation signal according to a computation value generated based on the reference voltage and the amplified error signal.

3. The control circuit according to claim 1, wherein the compensation generation circuit comprises:
    an amplification circuit, coupled to the error detection circuit, and configured to receive the error signal, and to amplify the error signal to output an amplified error signal; and
    an operational circuit, coupled to the amplification circuit and the comparison circuit, and configured to receive the reference voltage and the amplified error signal, and to output the compensation signal according to a difference between the reference voltage and the amplified error signal.

4. The control circuit according to claim 1, wherein the ramp generation circuit is configured to receive the error signal, to perform an operation on the error signal, and to perform a voltage-to-current conversion on the error signal subjected to the operation to output the ramp signal.

5. The control circuit according to claim 1, wherein the ramp generation circuit comprises:
    a capacitor;
    an integration circuit, coupled to the error detection circuit, and configured to receive the error signal, and to integrate the error signal to output an integrated error signal; and
    a transconductance amplification circuit, coupled to the integration circuit, the capacitor and the comparison circuit, and configured to receive the integrated error signal, and configured to convert the integrated error signal into a conversion current to charge the capacitor with the conversion current, so as to output the ramp signal.

6. The control circuit according to claim 1, wherein the comparison circuit is configured to output a setting signal, and to adjust a voltage level of the setting signal according to the compensation signal and the error signal, wherein when the ramp signal is greater than the compensation signal, the comparison circuit switches the voltage level of the setting signal from a first voltage level to a second voltage level each fixed time interval, to generate the at least one trigger pulse.

7. The control circuit according to claim 1, wherein the comparison circuit comprises:
 a comparator, configured to output a setting signal, to compare the ramp signal with the compensation signal, and to adjust a voltage level of the setting signal according to a comparison result of the ramp signal and the compensation signal, wherein the comparator adjusts the setting signal from a first voltage level to a second voltage level when the ramp signal is greater than the compensation signal; and
 a delay circuit, coupled to the comparator, and configured to output the setting signal with the second voltage level each fixed time interval to generate the at least one trigger pulse.

8. The control circuit according to claim 7, wherein the compensation generation circuit is coupled to an inverting input terminal of the comparator, and the ramp generation circuit is coupled to a non-inverting input terminal of the comparator.

9. The control circuit according to claim 1, wherein the error detection circuit comprises:
 a resistor, coupled to the phase output terminal of the multi-phase power converter circuit, and configured to generate a conversion voltage dependent on the phase current;
 a first operational circuit, coupled to the resistor, and configured to receive the conversion voltage and the reference voltage, and to generate a dependent reference voltage according to a difference between the reference voltage and the conversion voltage; and
 a second operational circuit, coupled to the first operational circuit, and configured to receive the dependent reference voltage and the output voltage, and to generate the error signal according to a difference between the dependent reference voltage and the output voltage.

10. The control circuit according to claim 1, wherein the multi-phase power converter circuit comprises an on-time generation circuit and a power stage circuit, and the at least one trigger pulse is configured to trigger the on-time generation circuit to control the power stage circuit to operate according to a predetermined duty ratio.

11. The control circuit according to claim 1, wherein the comparison circuit is configured to stop generating the at least one trigger pulse when the compensation signal crosses the ramp signal.

12. A multi-phase power converter circuit, configured to receive an input voltage at a voltage input terminal and to output an output voltage at a voltage output terminal, and comprising:
 a power stage circuit, coupled to the voltage input terminal, and coupled to a phase output terminal via an inductor; and
 a control circuit, coupled to the power stage circuit, the phase output terminal and the voltage output terminal, and configured to generate an error signal according to a phase current of the phase output terminal, the output voltage and a reference voltage, to generate a compensation signal according to the reference voltage and the error signal, to generate a ramp signal according to the error signal, and to control the power stage circuit to operate according to a predetermined duty ratio when the ramp signal crosses the compensation signal, so as to increase the phase current.

13. The multi-phase power converter circuit according to claim 12, further comprising:
 an on-time generation circuit, coupled between the control circuit and the power stage circuit, and configured to be triggered by the control circuit to control the power stage circuit to operate according to the predetermined duty ratio when the ramp signal crosses the compensation signal.

14. The multi-phase power converter circuit according to claim 12, wherein the control circuit comprises:
 an error detection circuit, coupled to the phase output terminal and the voltage output terminal, and configured to detect the phase current and the output voltage, and to output the error signal associated with the phase current, the output voltage and the reference voltage;
 a compensation generation circuit, coupled to the error detection circuit, and configured to amplify the error signal, and to output the compensation signal according to a computation value generated based on the reference voltage and the amplified error signal;
 a ramp generation circuit, coupled to the error detection circuit, and configured to perform an operation on the error signal, and to perform a voltage-to-current conversion on the error signal subjected to the operation to output the ramp signal; and
 a comparison circuit, coupled to the compensation generation circuit and the ramp generation circuit, and configured to receive the compensation signal and the ramp signal, and to generate at least one trigger pulse when the ramp signal is greater than the compensation signal.

15. The multi-phase power converter circuit according to claim 14, wherein the control circuit further comprises:
 an on-time generation circuit, coupled between the comparison circuit and the power stage circuit, and configured to be triggered by the at least one trigger pulse to control the power stage circuit to operate according to the predetermined duty ratio.

16. The multi-phase power converter circuit according to claim 14, wherein the compensation generation circuit comprises:
 an amplification circuit, coupled to the error detection circuit, and configured to receive the error signal, and to amplify the error signal to output an amplified error signal; and
 an operational circuit, coupled to the amplification circuit and the comparison circuit, and configured to receive the reference voltage and the amplified error signal, and to output the compensation signal according to a difference between the reference voltage and the amplified error signal.

17. The multi-phase power converter circuit according to claim 14, wherein the ramp generation circuit comprises:
 a capacitor;
 an integration circuit, coupled to the error detection circuit, and configured to receive the error signal, and to integrate the error signal to output an integrated error signal; and
 a transconductance amplification circuit, coupled to the integration circuit, the capacitor and the comparison circuit, and configured to receive the integrated error signal, and configured to convert the integrated error signal into a conversion current to charge the capacitor with the conversion current, so as to output the ramp signal.

18. The multi-phase power converter circuit according to claim 14, wherein the comparison circuit comprises:
- a comparator, configured to output a setting signal, to compare the ramp signal with the compensation signal, and to adjust a voltage level of the setting signal according to a comparison result of the ramp signal and the compensation signal, wherein the comparator adjusts the setting signal from a first voltage level to a second voltage level when the ramp signal is greater than the compensation signal; and
- a delay circuit, coupled to the comparator, and configured to output the setting signal with the second voltage level each fixed time interval to generate the at least one trigger pulse.

19. The multi-phase power converter circuit according to claim 18, wherein the compensation generation circuit is coupled to an inverting input terminal of the comparator, and the ramp generation circuit is coupled to a non-inverting input terminal of the comparator.

20. The multi-phase power converter circuit according to claim 14, wherein the error detection circuit comprises:
- a resistor, coupled to the phase output terminal of the multi-phase power converter circuit, and configured to generate a conversion voltage dependent on the phase current;
- a first operational circuit, coupled to the resistor, and configured to receive the conversion voltage and the reference voltage, and to generate a dependent reference voltage according to a difference between the reference voltage and the conversion voltage; and
- a second operational circuit, coupled to the first operational circuit, and configured to receive the dependent reference voltage and the output voltage, and to generate the error signal according to a difference between the dependent reference voltage and the output voltage.

* * * * *